June 20, 1972 H. E. GALANTY 3,671,090
CHOPPING MACHINE
Filed Sept. 11, 1970 3 Sheets-Sheet 2

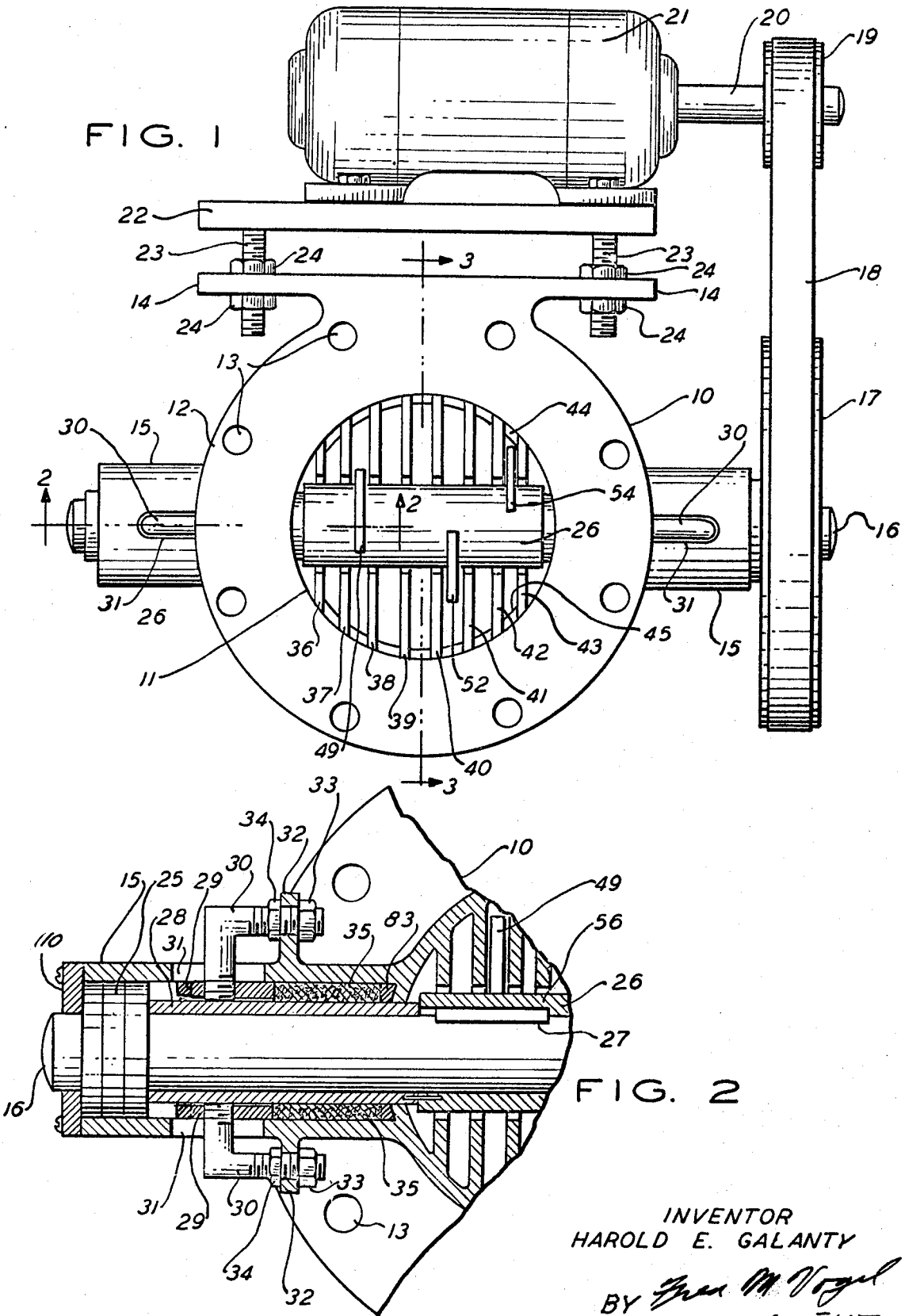

INVENTOR
HAROLD E. GALANTY
BY AGENT

June 20, 1972  H. E. GALANTY  3,671,090
CHOPPING MACHINE

Filed Sept. 11, 1970  3 Sheets-Sheet 3

INVENTOR
HAROLD E. GALANTY

BY
AGENT

United States Patent Office

3,671,090
Patented June 20, 1972

3,671,090
CHOPPING MACHINE
Harold E. Galanty, 36 Montgomery Road,
Livingston, N.J. 07039
Continuation-in-part of application Ser. No. 690,946,
Dec. 15, 1967. This application Sept. 11, 1970,
Ser. No. 71,574
Int. Cl. F16j 15/54
U.S. Cl. 308—36.1                3 Claims

ABSTRACT OF THE DISCLOSURE

A chopping machine adapted to be connected to a duct, particularly, a pipeline through which pieces of solid material are being transported by a stream of fluid and comprising a grating unit having slots and a cooperating chopper unit having chopper blades. The blades pass through the slots with a small clearance whereby the larger size pieces are chopped to a size which will pass through the slots and the blades continuously clean the surfaces of the slots to maintain a low flow resistance. The stuffing box structure has an adjusting member which extends laterally thereof so as to be operable in a readily-accessible side location and which may also serve to eject a shaft bearing. The mounting structure is supported from an end flange and extends some distance therefrom while remaining within the space defined by the planes of the side surfaces of the flange.

---

Figure 3:
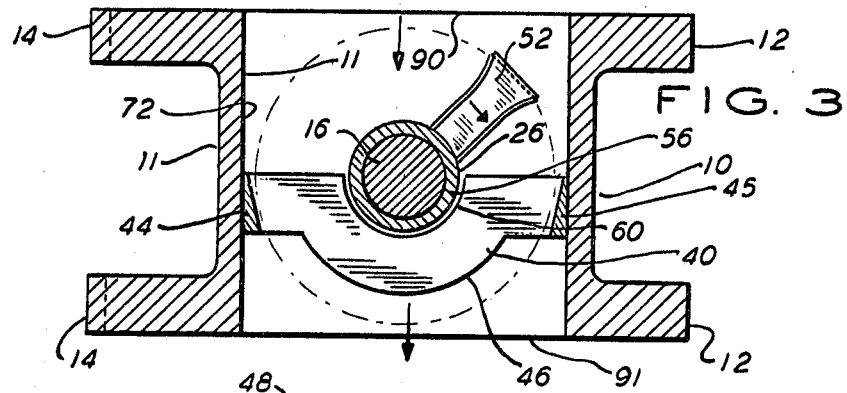

My invention relates to a machine for chopping into pieces of a predetermined readily-flowable size, larger size pieces or lumps of solid material being transported through the machine by a stream of a fluid.

The present application which is a continuation-in-part of my co-pending United States patent application Ser. No. 690,946 filed Dec. 15, 1967, is particularly concerned with structures which are especially advantageous in such machines, such as stuffing box structures and supporting structures.

The main object of my invention is to provide a machine which will chop a mass of solid pieces in such a way that the mass will be readily flowable.

A more specific object is to chop pieces of solid material being transported by a stream of a fluid through a duct or pipeline in such a manner that the material will be readily flowable and will not obstruct the pipeline or nozzles, process equipment, pumps, etc. in the line.

Another object is clean the mechanism proper, particularly the surfaces of the slots, during each revolution of the chopper unit.

A further object is to provide chopper units and grating units which cooperate to produce effective and efficient chopping, cleaning and sizing actions.

A still further object of my invention is to provide a chopping machine which is a self-contained unit with driven unit which can be readily installed in a pipeline and can be readily maintained without removing it from the line.

A more specific object is to provide a stuffing box structure which has a long life and can be readily adjusted even when the machine is located in a rather inaccessible position in a pipeline.

Another object is to provide a motor mounting structure which facilitates replacing and adjusting the motor while at the same time not interfering with installing the machine in the pipeline and removal therefrom.

Further objects and advantages of my invention will appear as the description thereof progresses.

The chopping machine according to my invention comprises a housing having a passageway for the material to be treated and a grating unit extending across the passageway and provided with slots. A rotatable chopper unit is located adjacent the grating and carries a plurality of chopper blades or knives which pass into and out of the slots with a small clearance to thereby chop the material and at the same time clean the slots during each revolution, to thereby reduce the flow resistance of the machine.

In one embodiment of my invention the chopper blades or knives are so shaped and spaced at their ends as to provide a cleaning action on the surface of the passageway and thus to prevent undesired build up of the material being treated.

In accordance with one embodiment of my invention claimed in the present application, a supporting structure has one end secured to an end flange and extends some distance laterally thereof while lying substantially with in the space defined by the planes of the end surfaces of the flange.

In another embodiment the grating is so shaped, that when installed in the passageway, at least a portion thereof will extend at an obtuse angle to the axis of the passageway to thereby increase the effective area of the slots.

In another embodiment of my invention a support carrying blades of equal length is given a bulbous shape so that the surface thereof, as well as the surface defined by the ends of the blades, will conform to a surface of revolution whose generatrix corresponds to a curve formed by the ends of a plurality of parallel ribs whose lengths are substantially equal to each other and to the lengths of the blades and which extend substantially the same distance from the surface of the tubular passageway.

In accordance with another embodiment of my invention being claimed in the present application, a stuffing box structure having packing has an adjusting member for the packing which member extends laterally the structure so as to be readily operated at a readily-accessible place to the side of the structure.

The terms "packing" and "packing material" as used herein and in the claims is to be understood to include not only the usual compressible packing materials but also members which form part of one of the various types of mechanical seals.

While I shall describe my invention in cooperation with chopping machines of the above type, for which the invention is particularly advantageous, I do not desire to be limited thereto as the invention is of wide application.

Figure 6:
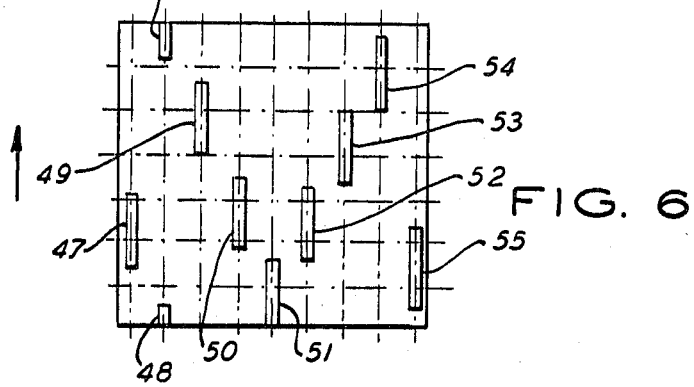
Figure 4:
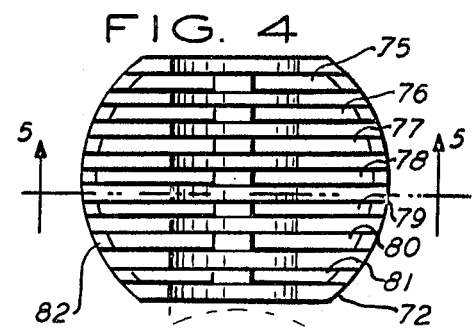
Figure 9:
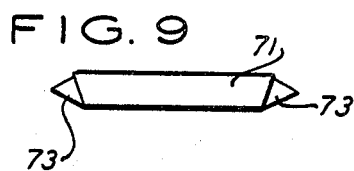
Figures 5, 7, 8:
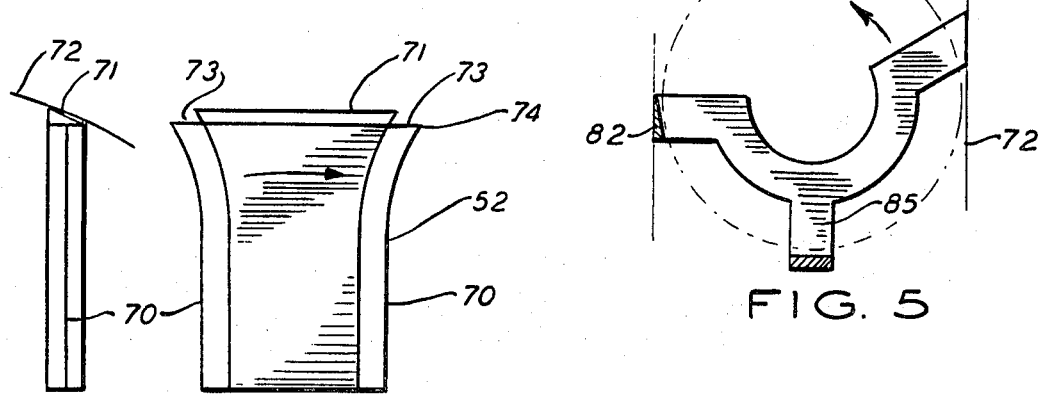
Figure 10:
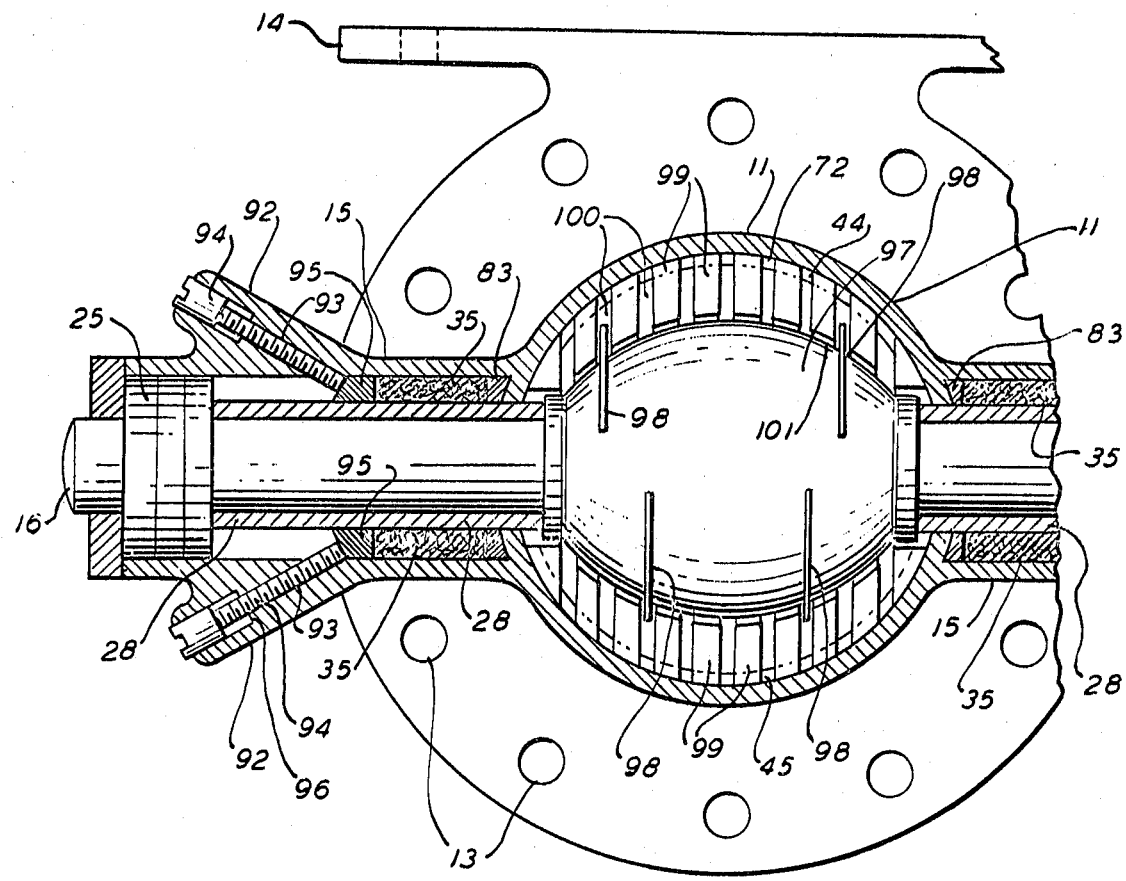
Figure 11:
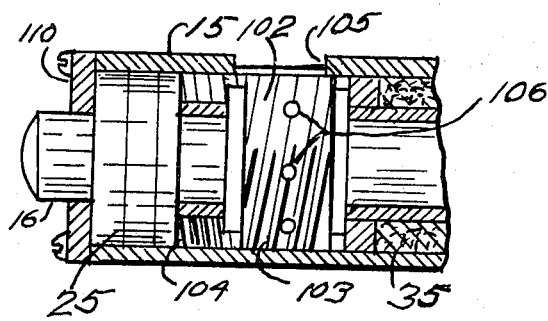

In order that my invention may be clearly understood and readily carried into effect I shall now describe the same in more detail with reference to the accompanying drawing in which:

FIG. 1 is a plan view of a chopping machine according to my invention,

FIG. 2 is a sectional view on a slightly enlarged scale of a portion of FIG. 1 taken along line 2—2 thereof, FIG. 3 is a sectional view taken along line 3—3 of FIG. 1, FIG. 4 is a plan view of a grating unit according to another embodiment of the invention, FIG. 5 is a sectional view taken along line 5—5 of FIG. 4, FIG. 6 is a diagram indicating the positions of the chopper blades on the rotor, FIG. 7 is an elevation view on an enlarged scale of the chopper blades shown in FIG. 3, FIG. 8 is a side view of FIG. 7, FIG. 9 is a top view of FIG. 7, FIG. 10 is a sectional view of a portion of a machine according to the invention, and FIG. 11 is a modified view of a portion of FIG. 10.

The machine in FIGS. 1, 2 and 3 comprises a housing 10, which may be of stainless steel or other suitable material, having a tubular portion 11 forming a passageway having an inlet 90 and an outlet 91 and two end flanges 12 each provided with eight clearance holes 13 and two mounting lugs 14. Lugs 14 extend within the confines of the flanges 12 i.e. are no thicker than the flanges so that there is no obstruction to fastening bolts in the upper holes 13, or to a mating flange or to adjacent machinery to which flanges 12 are to be connected. At its central part housing 10 is provided with two radially-extending tubular protuberances 15 which, as will be explained later in connection with FIG. 2, house bearings and stuffing boxes for a shaft 16. Secured to one end of shaft 16 is a pulley 17 driven by a V-belt 18 from a pulley 19 mounted on the shaft 20 of a driving motor 21.

Motor 21 is adjustably supported from the housing 10 in a simple and effective manner. As shown in FIG. 1, motor 21 is fixedly mounted on a metal plate 22 to each of the corners of which are secured one end of four studs 23. The free ends of studs 23 extend through clearance holes in mounting lugs 14 and are each provided with two locking nuts 24 whereby motor 21 may be locked in a position in which there will be proper tension on belt 18 and the axis of the motor will extend perpendicularly to the plane of travel of the belt. Such a mounting arrangement permits easy access to the flange bolts or nuts (not shown) used in holes 13 and also to the adjusting nuts 33 and 34 of the stuffing boxes (later to be described), without interference to a mating flange or connecting equipment.

The lugs 14 may be secured directly to the outer surface of the tubular passageway 11 at a point spaced from flanges 12. However, this limits access to nuts 33 and 34 and places an undesired strain upon the wall of passageway 12 which may be heavily stressed by high-pressure fluid passing therethrough.

In another construction, which is not shown, studs 23 are fixedly secured to lugs 14, or to flanges 12 at the outside of the tubular portion away from the flanges. Studs 23 would then pass through clearance holes in plate 22, or in a bracket attached thereto under the motor 21 if necessary to clear the latter. To lock the motor in position and maintaining proper tension in the belt, nuts would be provided on the top portions of studs 23 on each side of plate 22.

Referring now to FIG. 2, shaft 16 is rotatably mounted near each end on a ball or roller bearing 25 housed in one of the protuberances 15. Mounted on shaft 16 is a chopper blade unit 26 comprising a tubular support 56 keyed to the shaft at 27 and carrying nine chopper blades 47 to 55, only blades 49, 52 and 54 being shown in FIG. 1. Unit 26 is held in proper position axially to the shaft by means of two tubular spacers 28 each having one end pinned to support 56 and the other end engaging the side of bearing 25, which also act as thrust bearings.

A stuffing box provided in each of the protuberances 15 comprises a gland 29 slidably mounted in protuberance 28 and having two threaded holes into each of which is screwed the end of one leg of an L-shaped member 30 which leg extend with a loose fit through a slot 31 formed in the wall of protuberance 15. The other leg extends through a clearance hole in a lug 32 formed as part of protuberance 15 and has a threaded end carrying adjusting and locking nuts 33 and 34 respectively. By tightening nuts 33 gland 29 may be moved axially spacer 28 to thereby compress packing material 35 provided in the annular space between spacer 28 and the wall of the protuberance 15, whereupon the gland is locked in position by tightening nuts 34. A metal ring 83 located at the end of the packing 35 provides a flat bearing surface therefor.

If a mechanical seal is used, the above-described tightening of nut 33 would act upon the component of the seal which serves to adjust the same.

Bearing 25 may be readily removed from the protuberance 15 by first removing the detachable end cover 110. By loosening or removing nuts 33 and tightening nuts 34 gland 29 may be moved outwardly so as to contact bearing 25 and either eject the same entirely or only loosen it so as to permit manual removal.

Instead of the L-shaped member 30, it is possible to use an eye bolt secured at its free end to the gland 29 and with the eye end on the outside and urged toward the packing by means of cap screws passing through the eyes and adjustably secured to lug 32 by nuts 33 and 34. Lugs 32 may also be placed in locations other than that shown, for instance near bearing 25 so that the gland will be pushed rather than pulled as shown. Instead of being screwed into gland 29, one end of members 30 may be unthreaded and fit snugly in an unthreaded hole provided in gland 29. This simplifies the construction of the stuffing boxes.

In some cases I prefer to extend slots 31 to the free end of protuberance 15 so that gland 29 may be introduced therein with the member 30 fixed thereto. This simplifies the construction as well as the installation.

In the device according to the invention, the chopping or deagglomeration and the accompanying sizing to a maximum predetermined size of the solid material being transmitted through the device by a stream of a fluid is carried out by the cooperative action between a grating unit and a rotatable chopper unit. The grating unit comprises a plurality of ribs or bars spaced apart to form a plurality of parallel slots and the chopper unit comprises a rotatable support carrying a plurality of chopping blades. The blades are so arranged and dimensioned with respect to the slots of the grating unit that they follow a circular path into and out of the slots without contacting the grating. The number, shape and size of the slots and chopper blades, the clearance between the blades and ribs or bars depends upon a number of factors including the size, shape and nature of the solid material being treated, the nature, and velocity of the transport fluid as well as the maximum predetermined size to which the solid material is to be chopped.

Thus, the grating unit or structure serves as a sizing means to permit the passage through the machine of only those particles which are below a predetermined size and therefore are readily-flowable and will not deleteriously affect the operation of the machine or the duct and parts thereof in connection with which the machine is used. The chopper blades are so dimensioned and shaped with respect to the slots through which they pass that they serve as means both to chop the pieces of solid material being into sizes which permit them through the sizing means and also to continuously clean the surfaces of the machine, particularly of the ribs, of any material which might unduly restrict the flow of the fluid through the machine.

The grating unit illustrated in FIGS. 1, 2 and 3 comprises eight ribs 36 to 43 inclusive jointed at their ends by two curved supporting portions 44 and 45 which, as shown in FIG. 3, are secured. for instance welded, to the inner surface of tubular portion 11. Portions 44 and 45 have wedge-shaped cross-sections to permit the tips of the chopper blades (see blade 52 in FIG. 3) to sweep close to the inner surface of portion 11 to thereby prevent the accumulation at this point of any of the material being treated.

It will be noted that the upper or active chopping surfaces of the ribs 36 to 43 inclusive lie in a plane passing through the axis of rotation of shaft 16.

In some cases I prefer not to use a grating structure having ribs which are joined together at their ends, but to use individual ribs of the shape of ribs 36 to 43 each which have their ends fastened directly to the inner surface of portion 11, as shown in FIG. 2.

As shown in FIG. 3, rib 40 is generally semi-circular shape with a semi-curcular outer edge 46 and a semi-circular inner edge 60 for clearance to the tubular support 56. Portion 46 may be omitted by making ribs 36 to 43 in two sections each secured in a cantilever manner, for instance welded, to the inner surface of wall 11. Rib 39 is the same shape as rib 40. Ribs 38 and 41, ribs 37 and 42 and ribs 36 and 43 are pairs of the same shape, but are shorter than are the middle ribs 39 and 40 depending upon their distance from the axis of tubular portion 11, and also the diameter of the outer edge of the ribs may be decreased.

The eight ribs 36 to 43 form between themselves and with the wall of portion 11 nine slots though each of which pass with a small clearance one of nine chopper blades 47 to 55 mounted on the support 56. For simplification only blades 49, 52 and 54 are shown in FIGS. 1, 2 and 3.

The relative location of blades 47 to 55 on the chopper blade unit 26 is indicated in the diagram of FIG. 6 which is a development of the surface of support 56. The nine vertical broken lines indicate the center lines of the nine slots of the grading unit whereas the eight horizontal broken lines divide the circumference of the surface of support 56 into seven equal spaces. The small rectangles indicate the locations of the blades 47 to 55 and have these reference numerals applied thereto. It will be noted that the blades are arranged in a V or chevron formation. The blades are spaced apart equally horizontally (on the drawing) so as to be centered with the slots, but there is some variation in the spacing circumferentially in order to balance the chopper blade unit 26.

The plate-shaped chopper blade 52 shown in FIGS. 7, 8 and 9, which is of stainless steel or other suitable material, has side edges 70 of V-shaped cross-section and curve or flair outwardly at the end of the blade. The end of the blade has a surface 71, which is shaped so as to conform closely to the cylindrical surface 72 of tubular portion 11. Each of the upper corners of the blade is provided with a notch 73 which forms a tip 74 with each sharp side edge 70. Choppers of this shape give a very good chopping action and the notched tip 74 of the blades runs very close to the surface 72 to thereby sweep it clean of the material being chopped (see FIG. 3).

The remaining blades 47–51 and 53–55 are basically similar in shape to blade 52, but the lower portions thereof are reduced in length and the top angle of surface 71 varies because of the curvature of surface 72. Blades 47, 48, 49 and 50 are the same as blades 55, 54, 53 and 52 respectively, and are rotated through 180 degrees around their vertical axis when mounted on support 56.

The grating structure shown in FIGS. 4 and 5 comprises eight ribs 75 to 81 having opposite ends welded to curved members 82 which in turn are welded to the inner surfaces of housing 72. As shown in FIG. 5 members 82 have portions of wedge-shaped cross-section whose inner surfaces form the bottom of the slots and conform in shape to the path of the tips of the blades, as illustrated by the broken line circle in FIG. 5. A reinforcing bar 85 extends transversely the ribs 75 to 81 and is welded to the lower extensions thereof. As shown more clearly in FIG. 5, a portion of the ribs form an obtuse angle, shown as about 30 degrees with the axis of the tubular portion 11 in which it is installed. Thus the upper or active surfaces of ribs the 75 to 81 inclusive lie in two places which form an obtuse angle with each other and pass through the axis of rotation of shaft 16 shown in FIG. 3. The grating unit may be of other shapes so as to be in a sloping position when installed in portion 11. The use of a grating unit which, as shown, has at least a portion inclined at an obtuse angle provides an increased area for the flow of the material which passes through the machine.

From FIGS. 3 and 5 it will be noted that the circular path of the ends or tips of blades 52 project substantial distances beyond both sides of the grating structure to permit chopping when the fluid stream flows in the normal direction shown by the arrow in FIG. 3 or in the opposite direction. Such reversibility is frequently required in the chemical processing operations.

The machine shown in FIG. 10 is basically the same as that shown in FIGS. 1 and 3 and has the same parts indicated by the same reference numerals.

However, the machine of FIG. 10 has a simplified stuffing box construction and the grating unit and cooperating chopper blade unit are such that the slots of the grating unit and the chopper blades are all of substantially the same length.

As shown in FIG. 10 each of the two protuberances 15 is provided with two bosses 92 having threaded holes 93 extending at an acute angle, for instance 30 degrees, to the axis of shaft 16. If the wall of the protuberance 15 is sufficiently thick the bosses 92 could, of course, be omitted and the threaded holes 93 be placed in the wall. Extending through each of the holes 93 is a cap screw 94 whose end engages the inclined surface of a gland 95 to thereby compress packing 35, or to control a member of a mechanical seal (not shown) of a type known in this art. Holes 93 have countersunk end portions to provide a surface 96 adapted to be engaged by the head of screw 94 to thereby prevent the end of the screw from engaging the surface of rotable spacer 28.

The chopper blade unit of FIG. 10 has a bulbous-shaped support 97 which is fixedly secured to shaft 16 and carries nine chopper blades 98 (only four of which are shown in the figure). All of the blades 98 are of substantially the same size and shape and may be simply bar-shaped with end surfaces which conform to the surface 72 of housing portion 11. However, I prefer to use blades of the type described above in connection with FIGS. 7, 8 and 9 in which case all the blades would be the same except for the shape of the end surfaces.

The gland member 95 may serve also to loosen or eject the bearing 25 after the removal of the end cover 110. For this purpose the cap screws 94 and threaded holes may be rearranged so that the gland member may be pushed to the left to thereby contact the bearing. One construction in which the gland member may adjust the packing material and also loosen or eject the bearing is shown in FIG. 11 which is similar to a portion of FIG. 10. In FIG. 11 the tubular gland member 102 has external threads 103 which mesh with internal threads 104 on the wall of protuberance 15 which is also provided with an open space or window 105. Near the central part of window 105 the gland member 102 is provided around its periphery with a number of holes or axial grooves 106 (not shown) which can be snugly engaged by a suitable tool, for instance—a rod introduced through window 105 and rotated to turn member 102 and thereby either eject or loosen the bearing 25 or compress the packing material 35.

Secured to surface 72, for instance by welding, is a grating unit comprising ten rib portions 99 spaced apart to form nine slots 100 into each of which extends one of the blades 98. Rib portions 99 are supported at their ends by two curved supporting portions 44 and 45 and are generally of the shape of ribs 40 shown in FIG. 3, or the middle portions 46 may be omitted and each of half-ribs so formed may be welded in a cantilever fashion to portions 44 and 45. However, rib portions 99 extend out from surface 72 such a distance that all of the slots 100 will be the same length, which is slightly less than the length of the blades 98. The bulbous portion 97 has a surface 101 which conforms, with a small amount of clearance to the surface formed by the ends of rib portions 99. Thus, surface 101 is a substantial surface of revolution formed by revolving about the axis of shaft 16 as a generatrix formed by a line passing through the end of rib portions 99 in the place of the drawing.

While I have described my invention in connection with certain specific examples and embodiments I do not desire to be limited thereto as obvious modifications will readily present themselves to one skilled in this art.

What I claim is:

1. A stuffing box structure comprising a housing having a wall portion forming a tubular cavity, packing material within said cavity, a bearing removably mounted in said cavity and spaced from said packing material, a gland member mounted in said cavity between said packing material and said bearing, and means to selectively move said member into one position to adjust said packing material and into an opposite position to at least loosen said bearing.

2. A stuffing box structure according to claim 1 in which the gland member is provided with external threads cooperating with internal threads on the wall of the cavity.

3. A stuffing box structure according to claim 1 in which the wall portion is provided with a window and the gland member is provided with external threads cooperating with internal threads on the wall portion and is provided adjacent said window with a plurality of adjusting indentations spaced around the outer surface.

References Cited
UNITED STATES PATENTS

| 3,364,523 | 1/1968 | Schippers | 277—108 |
| 2,833,572 | 5/1958 | Moseley | 277—126 |
| 2,511,109 | 6/1950 | Haskell | 277—108 |
| 3,301,567 | 1/1967 | Barr | 277—108 |

M. CARY NELSON, Primary Examiner

W. H. WRIGHT, Assistant Examiner

U.S. Cl. X.R.

277—64, 108, 112